Feb. 20, 1940.                 C. ORT                  2,191,027
             COMBINED VIEW FINDER AND RANGE FINDER
                    Filed May 1, 1937          2 Sheets-Sheet 1
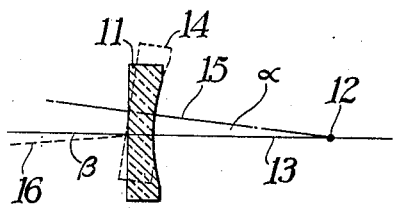
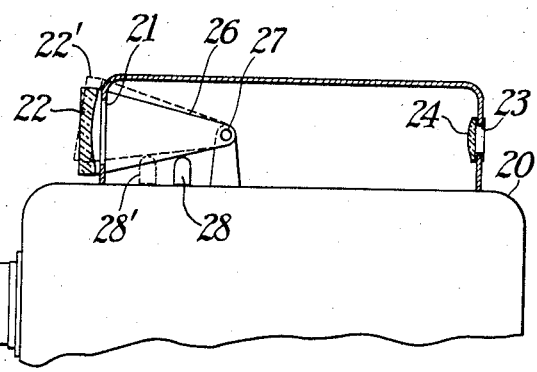
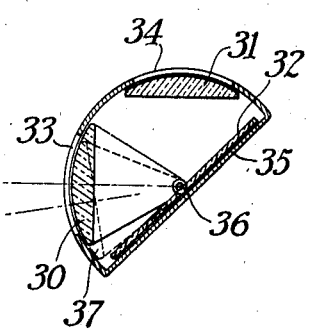
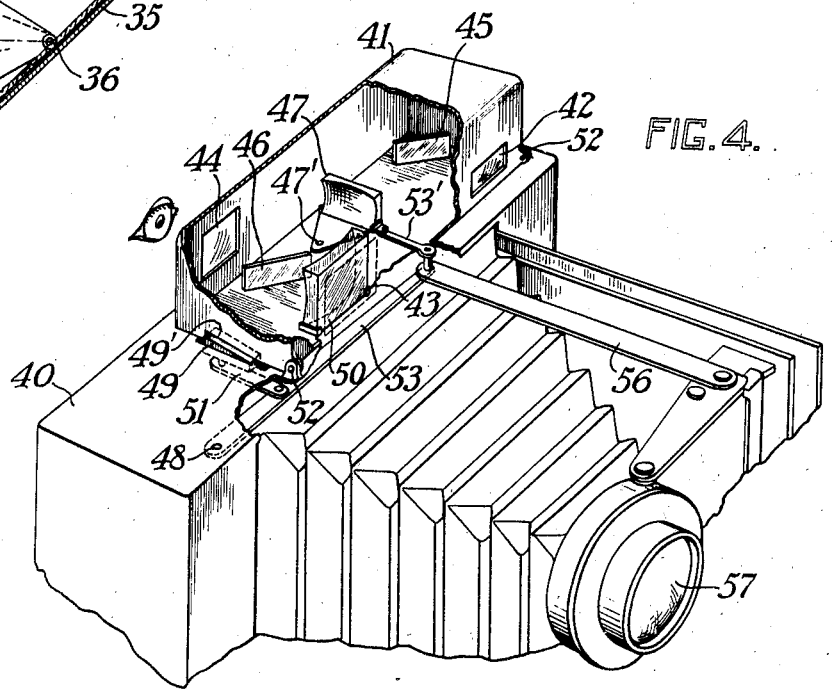
Carl Ort
  INVENTOR.
BY
       ATTORNEYS Feb. 20, 1940.   C. ORT   2,191,027
COMBINED VIEW FINDER AND RANGE FINDER
Filed May 1, 1937   2 Sheets-Sheet 2
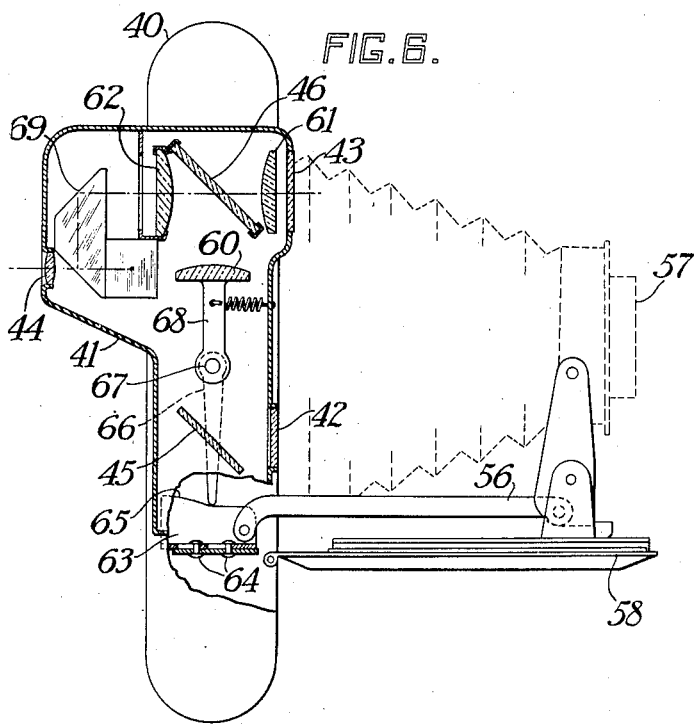
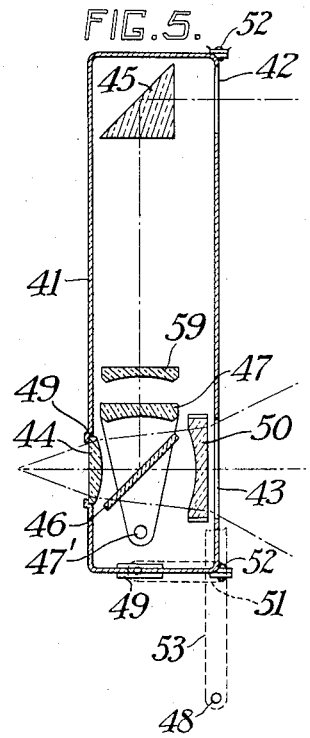
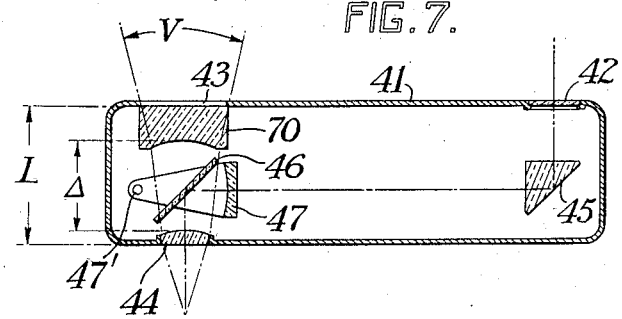
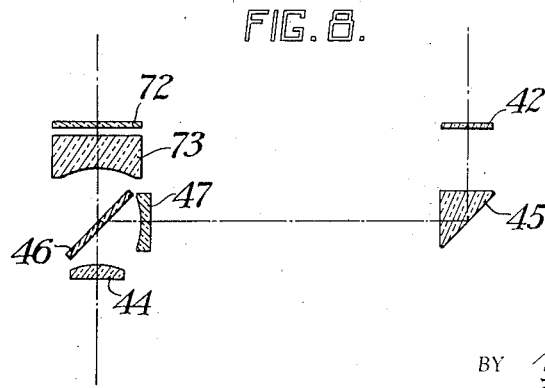
Carl Ort
INVENTOR.
BY Newton N. Perrins
Rolla H. Carter
ATTORNEYS Patented Feb. 20, 1940

2,191,027

UNITED STATES PATENT OFFICE 2,191,027

COMBINED VIEW FINDER AND RANGE FINDER

Carl Ort, Stuttgart, Germany, assignor to Eastman Kodak Company, Rochester, N. Y., a corporation of New Jersey Application May 1, 1937, Serial No. 140,231
In Germany July 28, 1936

8 Claims. (Cl. 88—1.5)

This invention relates to optical systems. It relates to optical systems which include means for deviating a ray of light and it also relates to the deviating means itself.

Many devices, such as prisms and glass wedges, are well known in the art as means for deviating light rays. It is sometimes desirable to use some such deviating means in an optical system in which lenses are also employed. It is an object of the present invention to provide a simple optical light deviating device which also comprises part of the lens system with which it is used, i. e., an optical device having variable deviating power and constant focal power.

It is also an object of the invention to provide a camera view finder incorporating such a light deviating means to correct for parallax.

It is still another object of the invention to provide a range finder employing the simplified light deviating device mentioned above.

It is a further object of the invention to provide a combination range finder and view finder employing this light deviating means and having means for coupling the light deviating means to the focusing arrangement of the camera with which it is employed, and/or means for providing an erect image in the view finder eye-piece when positive lenses only are employed, and/or a particularly simplified lens system which insures that the image seen in the combination view-finderrange-finder has sufficient magnification for range finding purposes and also includes the correct field of view for view finding purposes.

Other objects and advantages of the invention will become apparent from the following description when read in connection with the accompanying drawings in which:

Fig. 1 illustrates the primary optical principle of the invention as embodied in a plano concave lens mounted to rotate about a line through the center of curvature of the concave surface.

Fig. 2 is an elevation partly in section of a motion picture camera provided with a view finder incorporating the invention.

Fig. 3 is a sectional view of a reflecting type view finder constructed in accordance with the invention.

Fig. 4 is a perspective view showing a portion of a camera on which is mounted a combined range and view finder incorporating the invention.

Fig. 5 is a plan view in section of a modified form of the combination view finder and range finder shown in Fig. 4.

Fig. 6 is a side elevation partly in section of a camera having a combination view-finderrange-finder mounted on the side thereof and coupled with the camera focus adjusting means.

Fig. 7 shows a cross section of a range finder of the type shown in Fig. 4 and including a very simplified and convenient device for increasing the magnification of the image seen therein (to facilitate range finding) without altering the field of view (which must be correct for view finding purposes).

Fig. 8 shows a variation of the embodiment of the invention shown in Fig. 7, wherein slight adjustment of one of the optical elements is provided to permit relative focusing of the two fields of the range finder.

In Fig. 1 a plano concave lens 11 is mounted to rotate about a line through the center of curvature 12 of its concave surface. The optic axis of the system is shown as the line 13. When the lens 11 is rotated about the point 12 to the position shown by the broken line 14, the optic axis of the system is moved through an angle α to the position shown by the line 15. When the lens is in this position 14, a ray of light entering the system along the broken line 16 which is at an angle β will pass along the line 13. A simple computation will show that the angle α is considerably larger than the angle β and hence, a very accurate adjustment of this light ray deviating device is obtainable.

Thus, by means of this invention there is provided a simple optical device having both variable light deviating power and constant focal power. Thus the direction of light beam passing through the device is varied without altering its vergence.

An embodiment of the invention in which a deviating device having focal power is employed as a parallax correcting means is shown in Fig. 2 wherein a motion picture camera 20 is provided with a view finder comprising a negative lens 22 and a positive lens 24 whose apertures are defined by light shields 21 and 23 respectively. In accordance with the invention, the negative lens 22 is a plano concave lens mounted on a support 26 which is free to rotate about a pivot 27 which is rigidly supported with respect to the camera 20 and which lies on a line through the center of curvature of the concave surface of the lens 22 and perpendicular to the optic axis of the view finder system. When photographing near objects the plano concave lens 22 is rotated upward about the point 27 by any suitable means such as a bar 28 which is connected by suitable means (not shown) to the camera lens focusing arrangement and which presses upward against the support 26 for the plano concave lens 22. One such position for photographing nearby objects is shown by broken lines 26' and 22'. The optic axis of the system is, of course, defined by the light shields 21 and 23 and does not move when the front element 22 is thus rotated.

In most cases where the invention is to be employed, it has been found that either a plano concave or a plano convex lens may be used satisfactorily. The choice depends upon what optical power is required. As shown in Fig. 3, the use of plano convex lenses is particularly suitable when employing the invention with view finders of the reflection type. In this Fig. 3 a reflection type view finder is mounted in a housing 35 and comprises two positive lenses 30 and 31 the latter of which may be just a field lens. Light from the subject (not shown) passes through the opening 33 in the finder housing 35, through the convex plano lens 30 and is reflected by a mirror 36 through the lens 31 and the opening 34 in the finder housing 35 to the eye of the observer, not shown. The front lens 30 is free to rotate about a line through the center of curvature 36 of its convex surface. Assuming this finder to be mounted vertically above the lens of the camera with which it is used, the front lens 30 will take the position shown by the broken line 37 when photographing nearby objects. Thus correction for parallax is effected.

According to the invention, a range finder is provided as shown in Fig. 4, having a simplified light deviating means. The arrangement shown is a combination view-finder-range-finder wherein the direct beam of the range finder wholly constitutes the view finder field, and wherein the range finder light deviating means is coupled to the camera focusing adjustor. However, it is to be understood that this light deviating means may be incorporated in many various types of range finders without departing from the spirit of the invention.

This perspective drawing (Fig. 4) shows part of a camera housing 40 upon which is mounted a range finder 41 whose housing has been partly broken away to show the optical components therein which include two front windows 42 and 43 for transmitting the indirect and direct beams respectively and a rear window or eyepiece 44. In a well-known manner, the indirect beam is reflected by a fixed reflector 45 through a light deviating device 47 to a semi-transparent mirror 46 which reflects it to the eyepiece 44. The direct beam coming through the window 43 passes through a dispersive lens 50 to the eyepiece 44, and a portion of this beam passes through the semi-transparent mirror 46. In accordance with the invention, the light deviating means 47 comprises a plano concave lens pivotally mounted at 47' to be rotatable about a line through the center of curvature of its concave surface.

This plano spheric element may be adjustable by any convenient means such as a screw or it may be coupled to the comera focusing adjustor in any suitable manner. Examples of suitable coupling arrangements are shown in Figs. 4 and 6, but it is to be understood that other coupling means may be used without peregrinating from the province of the invention. In Fig. 4, the camera lens 57 may be focused by any of the well-known sliding bed mechanisms. This focusing adjustment is transmitted by an arm 56, a lever 53 pivoted at the point 48, and a connecting link 53' to adjust the range finder light deviating means 47.

To provide parallax correction in the view finder, the lever 53 is also connected by means of a link 51 to a wedge 49 engaging an edge 49' of one end of the range finder housing 41. As the camera lens 57 is focused on nearby subjects, this wedge 49 moves forward and to a predetermined degree tilts the range finder 41 which is rotatably mounted on pivots 52 so that the view finder field is corrected for parallax without interfering with the function of the view finder lenses as part of the range finder system.

A modified form of the range-finder-view-finder arrangement shown in Fig. 4, is shown in Fig. 5 in which an additional lens 59 cooperating with the lens 47, is provided in the reflected beam to permit easy and accurate focusing of this beam relative to the direct beam of the range finder. This auxiliary lens 59 is movable axially only and is not mounted to rotate about the point 47' with the lens 47.

In the form of the invention illustrated in Fig. 6 a range finder housing 41 mounted on the camera 40 is provided with front windows 42 and 43, an eye-piece 44 and two fixed reflectors 45 and 46. A plano convex lens 60 is used, in accordance with the invention, to provide a light deviating means. Positive lenses 61 and 62 providing a view-finder and one beam of the range finder, are mounted in alinement with the window 43. Since a view finder of this type using two positive lenses would present an inverted image to the eye of the observer, an erecting prism 69 is inserted in the light path between the lens 62 and the eye-piece lens 44. The erecting prism 69 introduces four right angle reflections into the path of the beam of light; two of these reflections are in the plane of the drawings and two are perpendicular thereto as shown.

The light deviating means 60 is mounted to be rotatable about the center of curvature of its convex surface. This center of curvature lies on the axis of rotation of a shaft 67 which extends through the camera housing into the range finder housing and carries the plano convex lens 60 by means of a support 68. The other end of the shaft 67, inside the camera housing, carries a lever 66, the end of which is in contact with a cam surface 65 formed on a member 63 which is free to slide on pins 64. These pins 64 project through slots, in the well-known manner, in a horizontal portion of the sliding member 63; this horizontal portion is shown only in vertical cross-section. The sliding member 63 is attached to the erecting arm 56 which connects with the support of the camera objective 57 as discussed in connection with Figure 4. The camera is focused by an adjustment of the sliding bed type, many variations of which are well known. That is, well-known means, not shown, are provided whereby the objective and its mount may be moved forward on the camera bed 58 to focus for near objects.

As is pointed out above, this movement is transmitted to the range finder deviating means 60 through the erecting arm 56, the sliding member 63 and its cam surface 65, the lever 66, the shaft 67, and the support 68. Thus, in using the device, the focusing adjustment on the camera bed 58 is continued until the range finder images are brought into coincidence in the well-known manner, at which time due to proper arrangement of the variable factors the camera will be properly focused. It will be apparent to those skilled in the art that these variable factors are chosen relative to one another and include the power of lens 60, the ratio of the lengths of the two lever arms 68 and 66 and the shape of the cam 65.

The combination range-finder-view-finders shown in Figs. 4 and 5 have as a view finder an inverted Galilean telescope. The reflected beam of the range finder also traverses an inverted Galilean telescope wherein the front negative component also wholly constitutes the ray deflecting means.

In a combination view-finder-range-finder of this type there are two requirements which are somewhat conflicting. For range finding purposes it is usually desirable to have as high a magnification as possible. For view finding purposes, it is necessary that the total field of view included be approximately that which is to be photographed. In most optical systems, the field of view decreases when the magnification increases.

A simple and satisfactory form of wide angle, high magnification, system is shown in Figs. 7 and 8. I have found that satisfactory magnification for range finding purposes may be obtained (while the angle, marked V in the figure, which defines the field of view is maintained constant) by using a thick plano concave lens 70 for the front element of the view finder. It will be apparent to those skilled in the art that the magnification factor increases, i. e., approaches unity, as the distance between the concave surface of the element 70 approaches the convex surface of the eye-piece 44, that is, as the value Δ becomes smaller. As is well known, the power of the concave surface of the element 70 must become less as the value Δ decreases if the combination of the components 70 and 44 is to form an inverted Galilean telescope at all times. However, in this embodiment of the invention, a thick lens 70 is used decreasing the value Δ (i. e., giving higher magnification) but maintaining the field of view as defined by the angle V unchanged. Hence, the optical system serves satisfactorily as a view finder. The distance between the front plano surface of the component 70 and the rear plano surface of the eye-piece component 44 is designated as L. I have found that a system in which the ratio of Δ to L is between .5 and .75 gives the most satisfactory results.

A similar arrangement is shown in Fig. 8 wherein the plano concave component 70 is divided into two elements, a plano-disk 72 and a plano concave element 73. The plane disk 72 may constitute the front window of the range finder and the plano concave element 73 is made adjustable axially to focus one-half of the range finder field relative to the other half.

It is to be understood that any of the lens components in the optical systems shown may, in most cases, be compound to correct for optical aberrations if so desired.

In the accompanying claims, elements or lenses are said to be optically axially spaced or spaced on the optic axis when positioned and separated on the optic axis of the system, even though this optic axis may be bent as by reflection by a mirror. Range finders as shown in Figs. 4 to 8 comprise effectively two optical systems and hence have two optic axes which, when they reach the eye are coincident or adjacent to one another.

Having thus described the invention which consists of a very simple optical device having both power and the ability to be adjusted to deviate the path of a ray of light, I wish to point out that the invention is not confined to the specific structures and applications shown but is of the scope of the appended claims.

What I claim and wish to protect by Letters Patent of the United States is:

1. A view finder optical system comprising as its objective lens a plano spheric element mounted rotatable about a line perpendicular to the optic axis of the element at the centre of curvature of its spherical surface whereby said lens element may be rotated to adjust the view finder field.

2. A coincidence type range finder adapted for use with a camera and comprising, as its light deviating means, an isolated plano spheric lens element mounted rotatable about a line perpendicular to the optic axis of the element at the centre of curvature of its spherical surface whereby said lens element may be rotated to obtain coincidence of the range finder fields without altering the magnification of either of said fields.

3. A coincidence type range finder according to claim 2 characterized by the inclusion of an additional lens for focusing purposes positioned to cooperate with the plano spheric lens and adjustable axially only.

4. In an optical system, wedge means having focal power, and consisting of an isolated single plano spheric lens element mounted rotatable about a line perpendicular to the optic axis of the element at the centre of curvature of its spherical surface whereby rotation of the lens element in a light beam and about said line produces varying deviation of the light beam without affecting its vergence.

5. In an optical system, wedge means having focal power, adapted for use as a light deviator and consisting of an isolated plano concave lens element, a pivotally supported mount for the element, and a pivot for the mount, said pivot being positioned on a line perpendicular to the optic axis of said element at the centre of curvature of its concave surface, whereby said lens element is rotatable to provide variable light deviating power with constant focal power.

6. An optical system with a deviatable axis for viewing an object, said system comprising an ocular and wedge means having focal power spaced in front of the ocula on the optic axis of the system, said wedge means consisting of an isolated single plano spheric lens element mounted rotatable about a line perpendicular to the optic axis of the element at the centre of curvature of its spherical surface whereby rotation of the element deviates the axis of the system in front of the element without affecting the axis between the element and the ocular.

7. An optical system with a deviatable axis comprising a plurality of optically axially spaced lenses one of which consists of an isolated single plano spheric element mounted rotatable about a line perpendicular to the optic axis at the centre of curvature of its spherical surface.

8. An optical system for camera finders comprising as its objective lens a plano spherically concave element mounted rotatable about a line perpendicular to the optic axis of the element at the center of curvature of its concave surface whereby said lens element may be rotated to deviate the optic axis of the system.

CARL OHT.